United States Patent [19]

Takeuchi et al.

[11] Patent Number: 5,051,004
[45] Date of Patent: Sep. 24, 1991

[54] RADIAL BALL BEARING HAVING A CURVED CHAMFER BETWEEN A RACEWAY GROOVE AND ITS SHOULDER

[75] Inventors: Masamichi Takeuchi; Nobuyuki Seo, both of Osaka, Japan

[73] Assignee: Koyo Seiko Co., Ltd., Osaka, Japan

[21] Appl. No.: 573,068

[22] Filed: Aug. 27, 1990

[30] Foreign Application Priority Data

Sep. 11, 1989 [JP] Japan .................................. 1-235191

[51] Int. Cl.$^5$ .................................................. F16C 33/58
[52] U.S. Cl. ...................................... 384/516; 384/512
[58] Field of Search ............... 384/490, 512, 513, 516, 384/568

[56] References Cited

U.S. PATENT DOCUMENTS

| 1,587,184 | 6/1926 | Riebe | 384/516 |
| 3,370,899 | 2/1968 | Eklund | 384/516 |

FOREIGN PATENT DOCUMENTS 64-30924 2/1989 Japan .

1278509 12/1986 U.S.S.R. .............................. 384/490

Primary Examiner—Thomas R. Hannon
Attorney, Agent, or Firm—Wenderoth, Lind & Ponack

[57] ABSTRACT

A radial ball bearing has a pair of bearing rings each of which has at least one raceway groove with a certain radius of curvature in an axial direction and a shoulder of the raceway groove. The raceway groove of one of the bearing rings is opposed to the raceway groove of the other bearing ring, and a plurality of balls are rotatably provided between the opposite raceway grooves of the bearing rings. Each of the bearing rings has a curved portion with a radius of curvature in the axial direction which is equal to or greater than that of the raceway groove between the raceway groove and the shoulder of the raceway groove. The curved portion extends from a point within an ellipse of contact produced at the bearing ring by a predetermined axial load and is smoothly continuous from the raceway groove, the point making an inflection point between the raceway groove and the curved portion.

1 Claim, 7 Drawing Sheets

RADIAL BALL BEARING HAVING A CURVED CHAMFER BETWEEN A RACEWAY GROOVE AND ITS SHOULDER

BACKGROUND OF THE INVENTION

1. Field of the Invention

The present invention relates to an improvement of a radial ball bearing used to support a shaft such as a rear shaft in a motor vehicle, for example, on which both radial loads and axial loads act.

2. Prior Art

Double row angular contact ball bearings have conventionally been used for rear shaft support in a motor vehicle and similar applications where it is necessary to support a shaft on which both radial loads and axial loads act.

Figure 1:
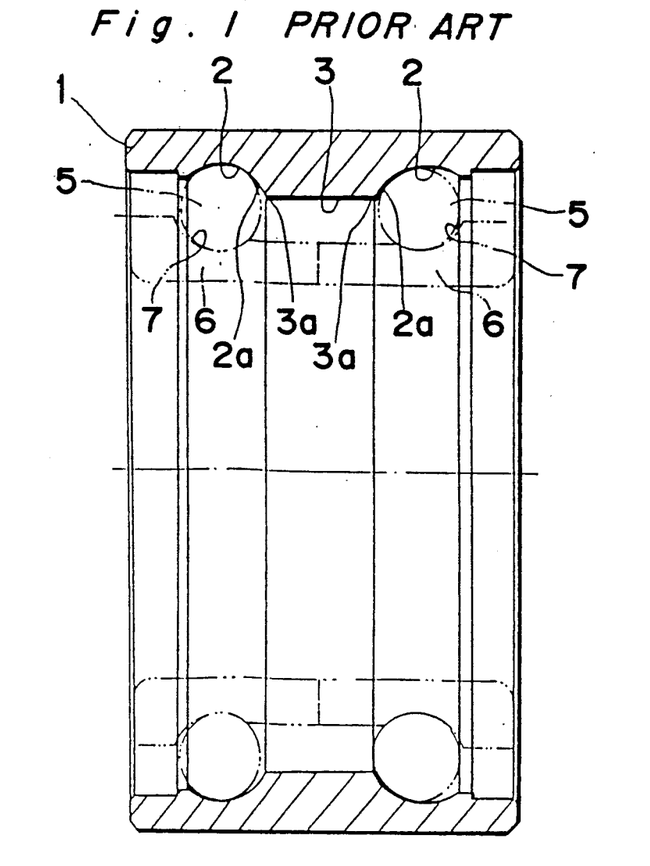
FIG. 1 is a cross sectional view taken along the axial direction of the outer ring of a conventional radial ball bearing.

A conventional double row angular contact ball bearing for supporting a rear shaft of a motor vehicle is shown in FIG. 1. As shown in FIG. 1, an outer ring 1 of the bearing has two raceway grooves 2 on its inner periphery. Between the raceway grooves is formed a shoulder 3. Similarly, an inner ring 6, indicated by a dotted line, of the bearing also has two raceway grooves 7 on its outer periphery in positions opposite to the other raceway grooves 2. Balls 5 are provided between the raceway grooves 2 and 7 of the outer and inner rings 1 and 6 such that the balls 5 can rotate freely. When the motor vehicle is advancing straight or is stopped, the bearing receives a radial load in the vicinity of the intersection of the raceway groove 2 and the direction of a load initially designed to act on the ball 5 at the time of assemblage of the bearing. During cornering or turning of the motor vehicle, the direction of the load acting on the ball 5 moves. As a result, a contact angle increases, and the load is received on a side surface 2a of the raceway groove 2.

Figure 2:
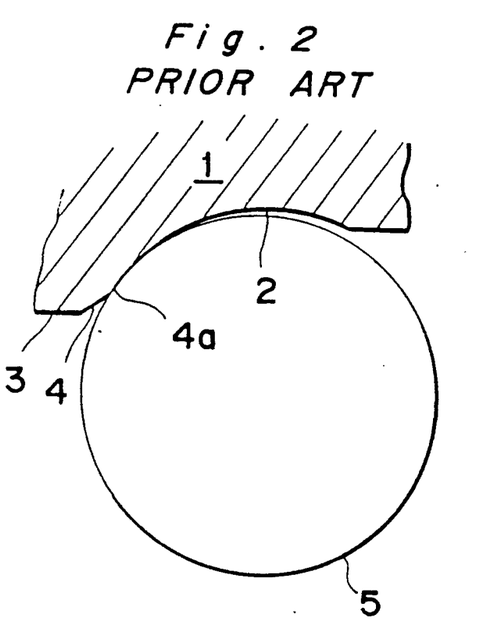
FIG. 2 is a cross sectional view showing another conventional radial ball bearing wherein a chamfer is provided at an edge of a raceway groove.

However, when the conventional double row angular contact ball bearing receives a large axial load, an ellipse of contact produced between the ball 5 and the raceway groove 2 of the outer ring 1 overlaps an edge 3a formed by the raceway groove 2 and the shoulder 3. If the shoulder 3 is provided with a chamfer 4, as shown in FIG. 2, the ellipse of contact will overlap an edge 4a formed by the raceway groove 2 and the chamfer 4. An edge load is thus produced to act on the ball 5 and the edge 3a or 4a, so that the ball 5 and the edge 3a or 4a are dented. The dents will cause problems such as flaking of surfaces of the bearing rings 1 and 6 and balls 5, generation of abnormal noise, etc.

A solution to these problems is to extend the shoulder 3 inwards in the radial direction to increase the depth of the raceway groove 2 so that the ellipse of contact resulting from an axial load does not overlap the edge 3a or 4a. In this case, however, there is another problem, as follows.

Figure 3:
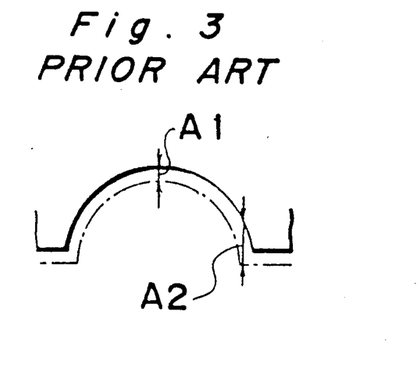
FIG. 3 is an illustration of a discrepancy in finishing allowances at the side and deepest portions of a raceway groove in a conventional radial ball bearing.

Generally, the raceway groove is provided with a finishing allowance uniform in the radial directions, as shown in FIG. 3. Nevertheless, a finish machining is performed only in one direction. Therefore, a substantial allowance A2 near the side portions 2a of the raceway groove 2 becomes significantly greater than that A1 at the deepest point in the raceway groove 2. As a result, the finish machining is extremely time-consuming, and production costs increase.

SUMMARY OF THE INVENTION

Therefore, an object of the present invention is to provide a radial ball bearing which, by alleviating an edge load, can suppress the occurrence of the early flaking to increase bearing life, and does not produce abnormal noises.

Another object of the present invention is to provide a radial ball bearing which can reduce the depth of a raceway groove, and does not require excessive time for finish machining.

The present invention provides an improvement of a radial ball bearing having a pair of bearing rings each of which has at least one raceway groove with a certain radius r of curvature in an axial direction and a shoulder of the raceway groove in such a manner that the raceway groove of one of the bearing rings is opposed to the raceway groove of the other bearing ring, and a plurality of balls rotatably provided between the opposite raceway grooves of the bearing rings. In the improvement, each of the bearing rings has a curved portion with a radius R of curvature in the axial direction which is equal to or greater than that r of the raceway groove between the raceway groove and the shoulder of the raceway groove. The curved portion extends from a point within an ellipse of contact produced at the bearing ring by a predetermined axial load and is smoothly continuous from the raceway groove, the point making an inflection point between the raceway groove and the curved portion.

Preferably, the radius of curvature R of the curved portion is five or more times as large as the radius of curvature r of the raceway groove.

The radial ball bearing of the present invention operates as follows.

As an axial load acting on the bearing becomes larger, the ellipse of contact produced in the raceway groove of a bearing ring moves from an initial position of the ellipse of contact toward the edge of the raceway groove. However, even if an extremely large axial load acts on the bearing, the axial load is well received by the curved portion. It is therefore possible to prevent the acting load from being concentrated at a single part of the contact area of the ball and bearing ring. Specifically, the edge load can be reduced.

Furthermore, the discrepancy in the finishing allowances at the side portion and deepest portion of the raceway groove can be eliminated because the raceway groove can be made shallow.

BRIEF DESCRIPTION OF THE DRAWINGS

The above and other objects and features of the present invention will become clear from the following description taken in conjunction with the preferred embodiments thereof with reference to the accompanying drawings throughout in which like parts are designated by like reference numerals, and in which.

DETAILED DESCRIPTION OF THE PREFERRED EMBODIMENTS

Figure 4:
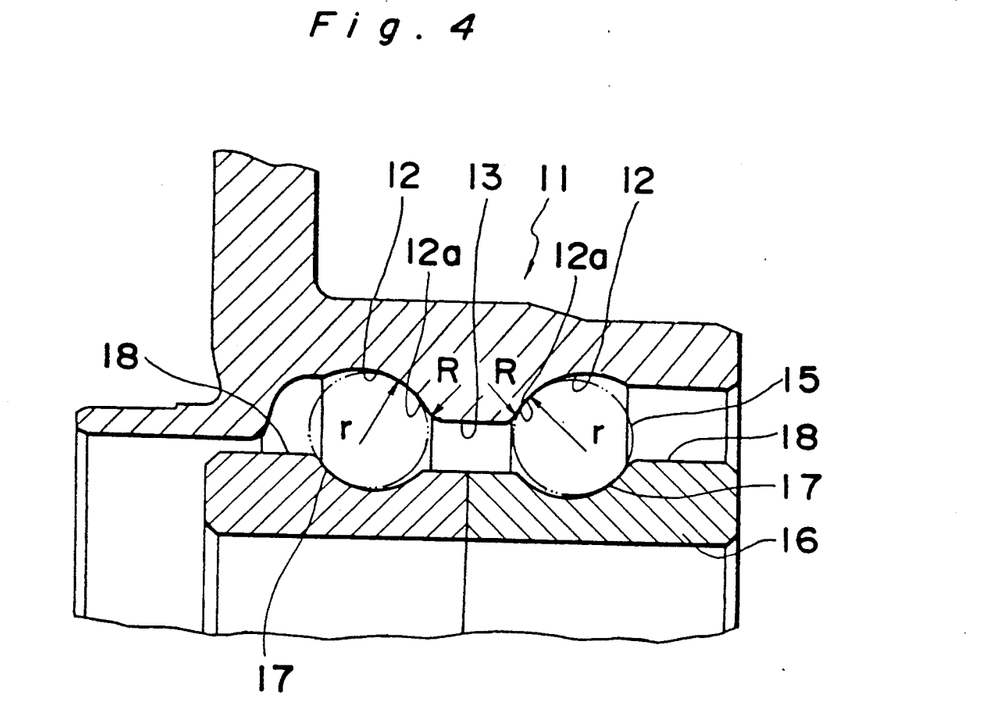
FIG. 4 is a cross sectional view taken along the axial direction of a radial ball bearing according to a first embodiment of the present invention.

FIG. 4 is a cross sectional view taken along an axial direction of a radial ball bearing according to a first embodiment of the present invention. As shown in FIG. 4, an outer ring 11 of the bearing has on an inner periphery two raceway grooves 12 with a radius of curvature r in an axial direction, and a shoulder 13 between the two raceway grooves 12. An inner ring 16 of the bearing provided radially inside the outer ring 11 has raceway grooves 17, each with a radius of curvature r in the axial direction, opposite the raceway grooves 12 of the outer ring 11. Balls 15 indicated by an imaginary line are arrayed between the raceway grooves 17 of the inner ring 16 and the raceway grooves 12 of the outer ring 11. When a radial load and an axial load act simultaneously on this bearing, the loads are received at a side portion 12a of the raceway grooves 12.

Figure 5:
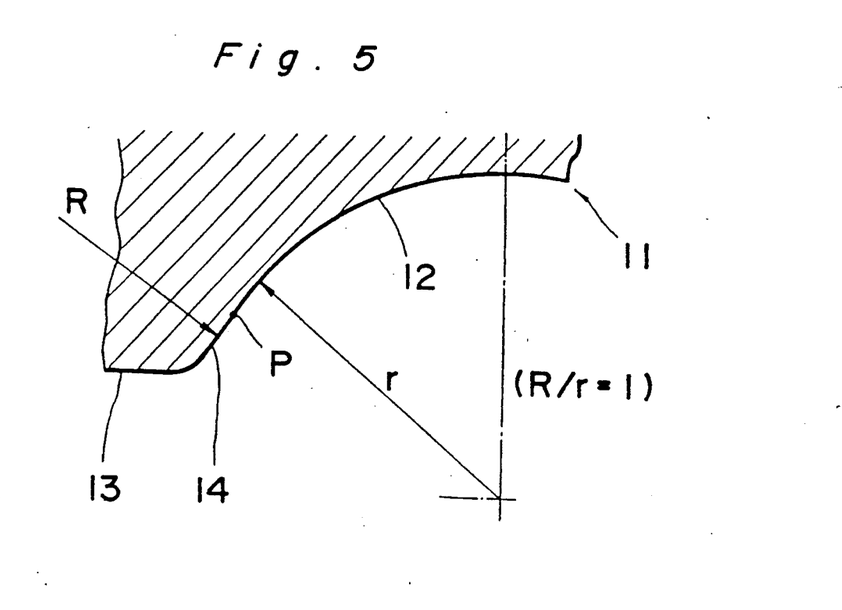
FIG. 5 is a cross sectional view of a part of FIG. 4, wherein P indicates an inflection point.

Referring to FIG. 5, between each raceway groove 12 and the shoulder 13 of the outer ring 11 is provided a chamfer 14 with a radius of curvature R in the axial direction such that the chamfer 14 continues smoothly from the raceway groove 12, forming a point of inflection (identified as P in FIG. 5) to the raceway groove 12. The chamfer 14 continues smoothly into an inner periphery of the shoulder 13. In this embodiment, the radius of curvature R of the chamfer 14 is equal to the radius of curvature r of the raceway groove 12 (the radius of curvature ratio R/r=1). In this case, the point of inflection P is determined so that it is within an ellipse of contact (see S in FIG. 8A) formed at the outer ring 11 when a rated axial load is applied to the bearing.

Between the raceway groove 17 and its shoulder 18 of the inner ring 16 is also formed a chamfer with a radius of curvature R. The following will mainly describe the raceway grooves 12 and chamfers 14 of the outer ring 11, but it should be noted that the description also applies with respect to the inner ring.

When an extremely large axial load acts on the bearing of the above construction, a contact angle ($\alpha$ in FIG. 8A) of the ball 15 to the outer ring 11 increases, and the ellipse of contact S produced in the raceway groove 12 moves toward the side of the raceway groove 12. At some point the ellipse of contact overlaps the point of inflection P, and the ball 15 begins to ride up on the shoulder 13. However, because the chamfer 14 is formed as described above between the shoulder 13 and the raceway groove 12, in other words, at a shoulder-side edge of the raceway groove 12, an edge load acting on the ball 15 is alleviated. Scratching of the ball surface or the edge of the raceway groove 12 is thereby suppressed, bearing life is thus extended, and the generation of abnormal noises is eliminated.

Figure 6:
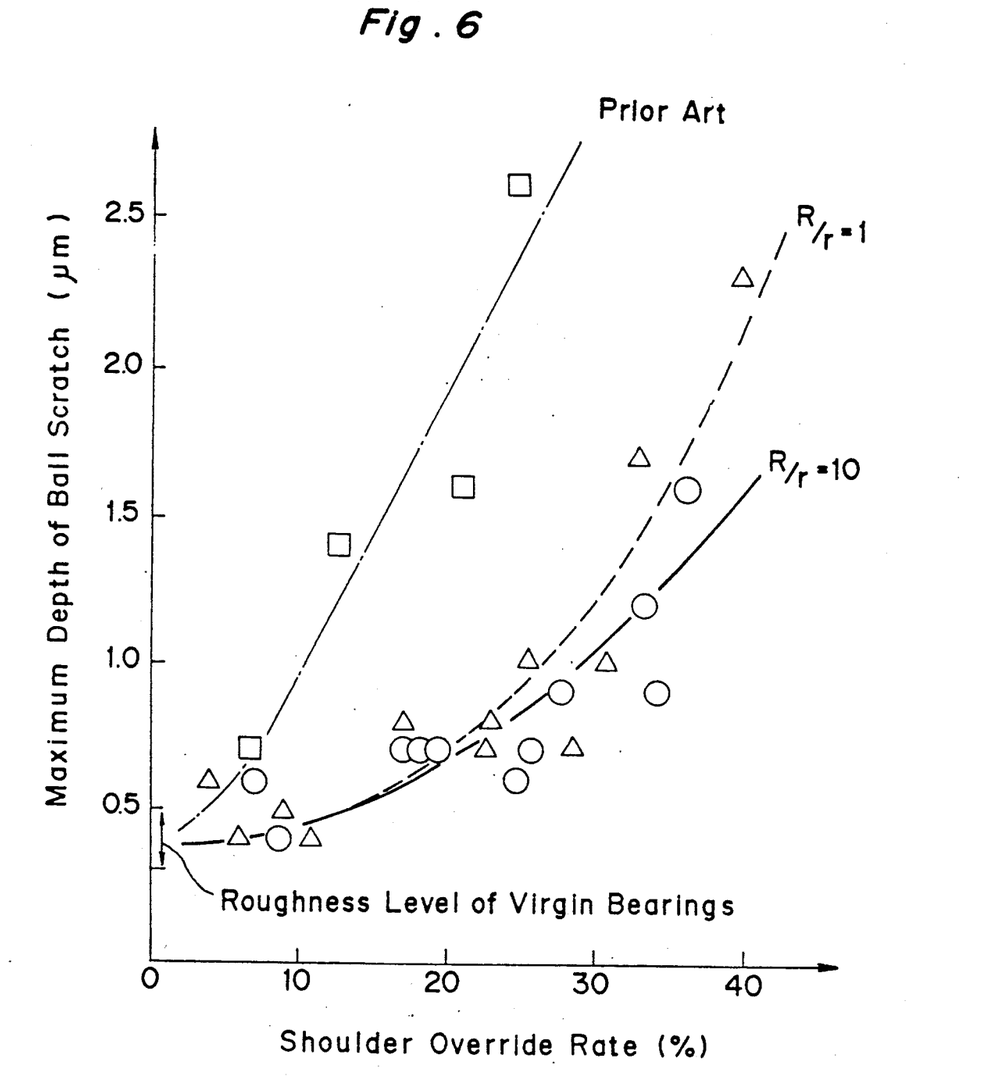
FIG. 6 is a graph showing the relationship between the shoulder (chamfer) override rate and the maximum ball scratch depth in first and second embodiments of the present invention and a conventional bearing.

FIG. 6 is a graph showing a comparison result between a prior art radial ball bearing as shown in FIG. 2 wherein a raceway groove 2 is provided at an edge with a chamfer 4, and radial ball bearings according to the present invention in the relationship between the shoulder override rate and the maximum depth of ball scratches. The axis of the abscissa shows the shoulder override rate (%), and the axis of the ordinate shows the maximum ball scratch depth ($\mu$m). In this comparison, the raceway grooves 2, 12 of the prior art bearing and the invention bearings were identical in shape, and the diameter at the point of inflection P, i.e., the inflection point diameter, of the invention bearings was the same as the diameter at the edge 4a (see FIG. 2) of the prior art bearing.

Figure 8A:
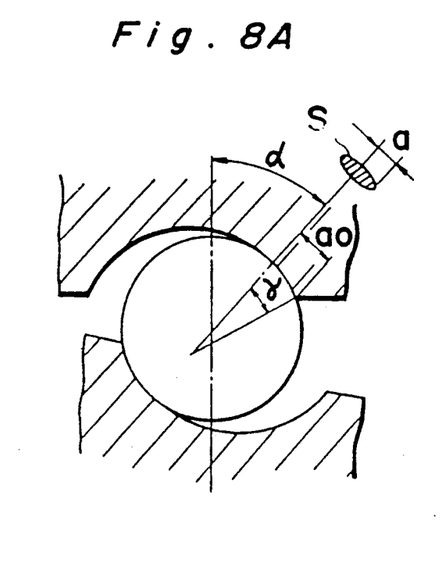
FIGS. 8A and 8B are views explaining the shoulder or chamfer override rate.

Referring to FIG. 8A, generally, shoulder override is defined to have occurred when $a \geq a_0$, where a is a long radius of the ellipse of contact S, and $a_0$ is a distance from the center of the ellipse of contact S to the edge of the shoulder. It is to be noted that in the present invention, $a_0$ is a distance from the center of the ellipse of contact S to the point of inflection P. Therefore, the term "chamfer override rate" is used for the case of the present invention instead of the term "shoulder override rate". The shoulder or chamfer override rate is defined as:

$$\text{Shoulder (Chamfer) override rate} = (a - a_0)/2a \times 100 \ (\%) \qquad (1)$$

The shoulder (chamfer) override rate may otherwise be considered to be the amount by which the ellipse of contact S protrudes from the edge of the raceway groove toward the shoulder (chamfer). The shoulder override rate increases as the axial load acting on the bearing increases, for example.

Figure 8B:
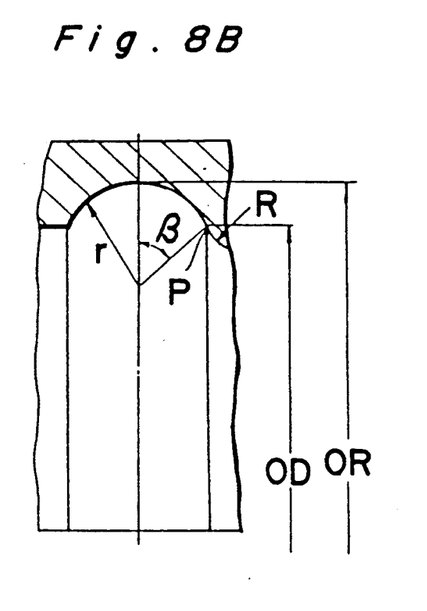

From FIG. 6 it will be understood that in the case of the prior art bearing the ball is deeply scratched due to the edge load caused by the edge 4a (see FIG. 2) and that the depth of ball scratches increases sharply as the shoulder override rate increases. The sharp increase in the depth of the ball scratches starts when the shoulder override rate is still low. On the other hand, in the case of the radial ball bearings according to the present invention, the depth of the ball scratches is clearly much less than that in the conventional bearing. The depth of the ball scratches for a certain shoulder override rate in the present invention proves to be a fraction of a value obtained at the same shoulder override rate in the conventional bearing. Therefore, if a scratch of the same depth is allowed, the shoulder (chamfer) override rate can be set higher with the shape of the edge portion of the raceway groove according to the present invention than with that according to the prior art. The ability to allow a higher shoulder (chamfer) override rate means that it is possible to reduce the value $a_0$ in the above equation (1) because the long radius a of the ellipse of contact S is constant. Furthermore, the relationships $$a_0 = r \times \sin \gamma$$

$$\gamma = \beta - \alpha$$

$$\beta = \cos^{-1}\{[r-(OR-OD)/2]/r\}$$

can be derived from FIGS. 8A and 8B. That it is possible to reduce the value of $a_0$ means that the value (OR−OD)/2, i.e., the distance from the deepest point in the raceway groove 12 to the point of inflection P (the depth of the raceway groove 12), can be reduced and thus the inside diameter at the shoulder 13 of the outer ring 11 can be increased. Furthermore, the finishing allowance in one direction of the raceway groove 12 can be reduced, so that the processing or machining time can be shortened and production cost can be reduced. In addition, because it is simpler to work out the raceway groove of this configuration, the quality of the finished raceway groove 12 can be improved, and the defect rate can be significantly reduced.

Figure 7:
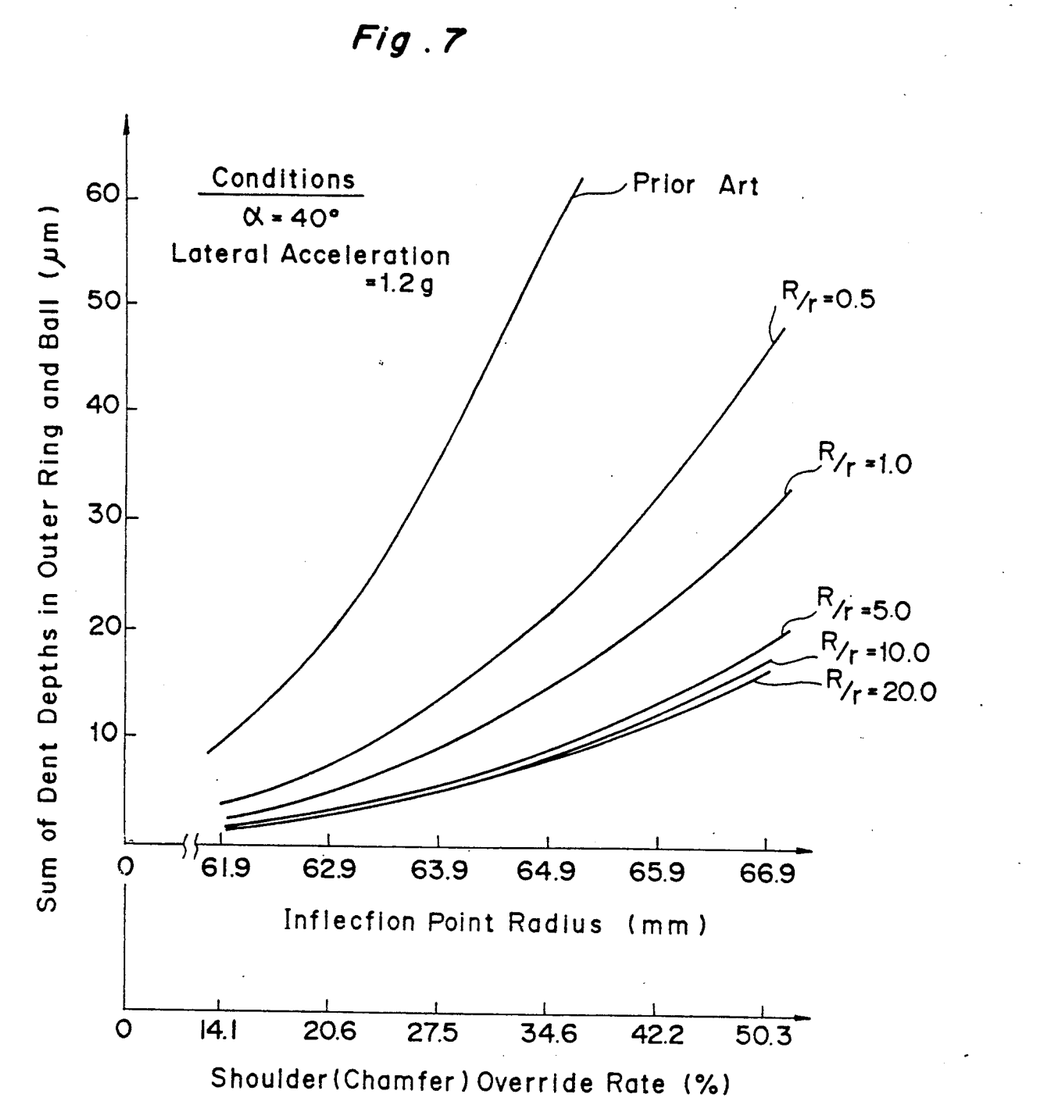
FIG. 7 is a graph showing the relationship between the sum of dent depths of the outer ring and the ball and the inflection point diameter, and the relationship between the sum of dent depths of the outer ring and the ball and the shoulder (chamfer) override rate in embodiments having different ratios of the radius of curvature, a comparative model, and a prior art bearing.

FIG. 7 is a graph showing test results relative to the relationship between the inflection point diameter and the sum of dent depths in the ball and in the raceway groove as well as the relationship between the shoulder override rate and the sum of dent depths. One axis of the abscissa shows inflection point diameters (OD in FIG. 8B) and the other axis of the abscissa shows the shoulder (chamfer) override rates (%) for the respective inflection point diameters. The axis of the ordinate shows the sum of dent depths ($\mu$m). The relationships shown in FIG. 7 were obtained for the conventional radial ball bearing with the chamfer 4 as shown in FIG. 2 at the edge of the raceway groove, and for bearings of the present invention with different ratios R/r of the radius of curvature under the following test conditions. The contact angle $\alpha$ was constant at 40 degrees, the lateral acceleration was 1.2 G, and the bearings were operated for a constant period of time. For a given constant contact angle $\alpha$, the shoulder override rate increases according to the increase in the inflection point diameter at the outer ring.

It will be understood from FIG. 7 that for the radius of curvature ratio R/r of 1 of the present embodiment, the sum of the dent depths at a given inflection point diameter (shoulder (chamfer) override rate) can be suppressed to a value lower than that obtained with the conventional bearing (indicated by A in the figure). Conversely stated, if a given dent depth sum is allowed, the inflection point diameter, which corresponds to the diameter at the edge in the conventional bearing, of a bearing with an R/r=1 profile according to the present embodiment can be made greater than the edge diameter of a bearing with a conventional profile, and the shoulder (chamfer) override rate can be set at a larger value. This conclusion drawn from FIG. 7 is the same as that drawn from FIG. 6 because there is a correlation between the maximum depth of the ball scratches and the sum of the dent depths in the ball and the raceway groove.

Figure 10:
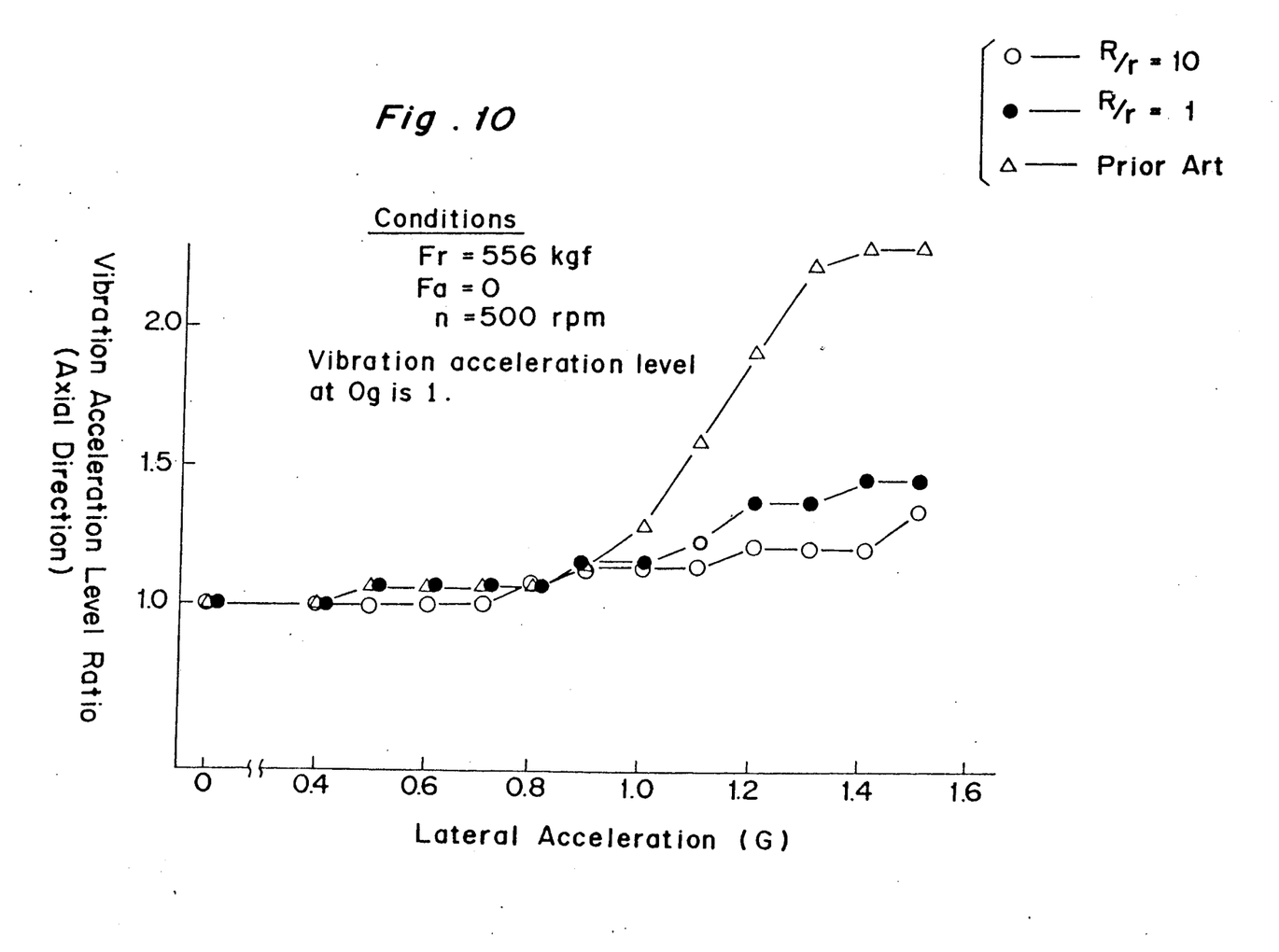
FIG. 10 is a graph showing the relationship between the lateral acceleration (G) and the vibration acceleration level ratio in the axial direction for the first and second embodiments of the present invention and a conventional bearing.
Figure 11:
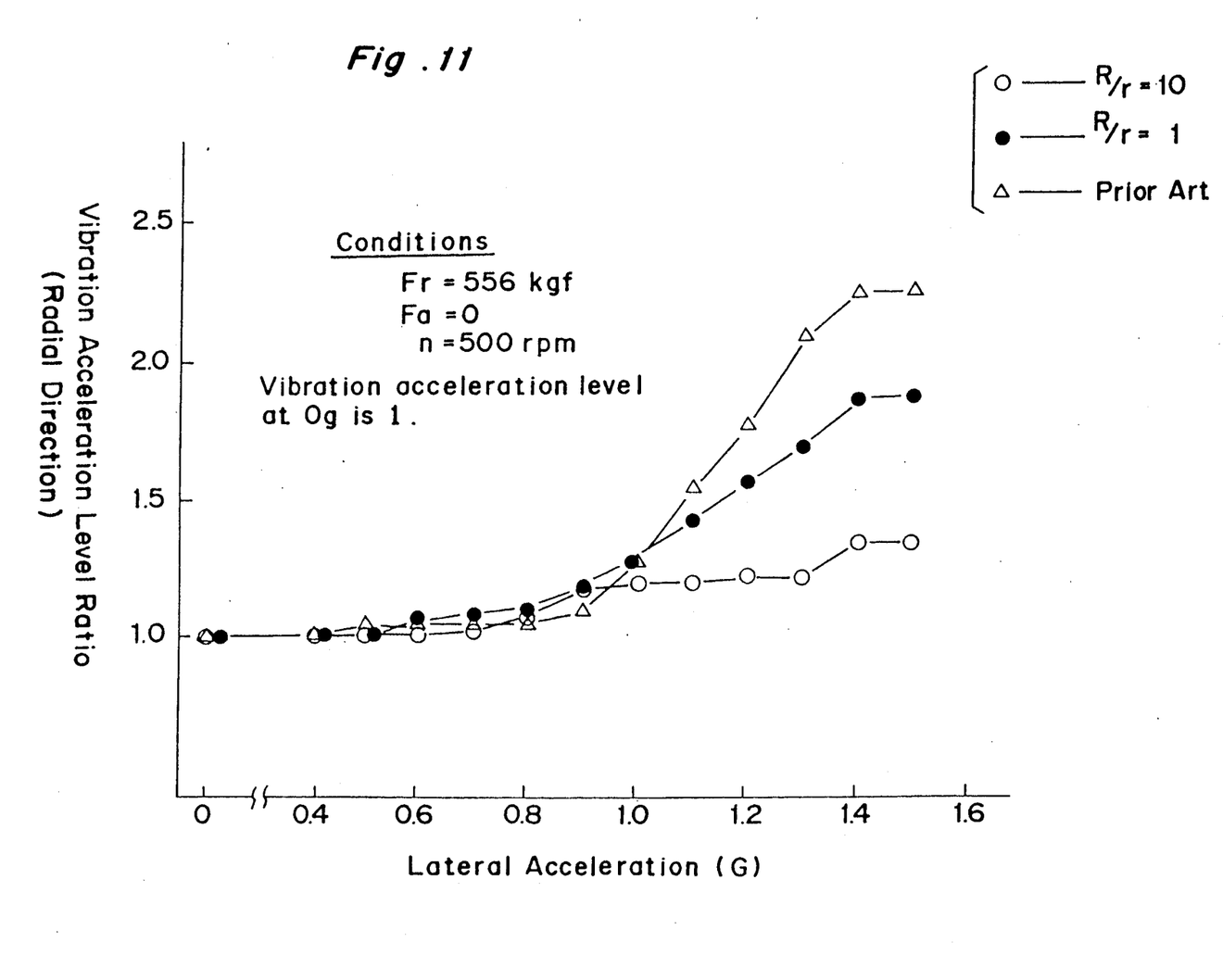
FIG. 11 is a graph showing the relationship between the lateral acceleration (G) and the vibration acceleration level ratio in the radial direction for the first and second embodiments of the present invention and a conventional bearing.

A prior art bearing having a chamfer 4 at an edge of a raceway groove as shown in FIG. 2 and invention bearings having different curvature radius ratios R/r including the present embodiment (R/r=1) were tested in order to obtain a relationship between the lateral acceleration (G) and the vibration acceleration level ratio in the axial direction and that between the lateral acceleration (G) and the vibration acceleration level ratio in the radial direction. FIGS. 10 and 11 show the test results, wherein the vibration acceleration levels in the axial and radial directions for the lateral acceleration of 0 G are set at 1.0, respectively. Vibration accelerations in the axial and radial directions were measured in the following manner. The bearings were first operated for a constant time period at the lateral acceleration of a given value under the conditions of Fr=556 kgf, Fa=0 kgf and n=500 r.p.m., where Fr indicates a radial force and Fa indicates an axial force. Then, the lateral acceleration was removed and the vibration accelerations in the axial and radial directions were measured.

From FIGS. 10 and 11 it will be understood that with the present embodiment (R/r=1) the vibration accelerations in both the axial and radial directions can be suppressed to values less than those obtainable with the conventional bearing, and that the increase in the vibration acceleration level ratio in the axial and radial directions can be greatly reduced particularly in the range where the lateral acceleration is greater than or equal to 0.8 G, i.e., the range where the increase in the vibration acceleration level ratios is sharp with the conventional bearing. This well supports the aforementioned results that the maximum depth of ball scratches in the present embodiment can be suppressed to a depth less than the maximum depth of ball scratches occurring with the conventional bearing. Furthermore, high level noise does not occur with the present embodiment because the vibration accelerations are reduced.

As thus described, according to the present embodiment, the chamfer 14 of the radius of curvature R equal to the radius of curvature r of the raceway groove 12 and forming the point of inflection P at the raceway groove 12 from which the chamfer 14 continues smoothly is provided between the raceway groove 12 and the shoulder 13. The chamfer 14 extends from within the range of the ellipse of contact S produced when a rated axial load is applied to the bearing. Accordingly, even though an extremely large load acts on the bearing, the load is prevented from concentrating and acting on one part of the contact area of the ball 15 and the raceway groove 12 during shoulder (chamfer) override of the ball 15. In other words, an edge load acting on the ball 15 or the edge of the raceway groove 12 is alleviated, and scratching or damage to the ball surface is suppressed. The bearing life is therefore extended, and even if a large axial load is applied, abnormal noises are not produced. Furthermore, when a given maximum ball scratch depth or sum of dent depths in the ball and raceway groove is allowed, the shoulder (chamfer) override rate can be set higher. It is thus possible to enlarge the diameter at the inflection point corresponding to the edge of the conventional bearings. Thereby the distance from the deepest point in the raceway groove 12 to the point of inflection P (i.e., the depth of the raceway groove 12) can be reduced and consequently the inside diameter of the shoulder 13 of the outer ring 11 can be increased. Therefore, it is possible to reduce the allowance for the finish machining of the raceway groove 12 from that required with the conventional bearings, resulting in cost reduction and a shorter required processing time. In addition, because of such an easy finish machining, the finished state of the raceway groove 12 can be improved, and the defect rate can be greatly reduced.

Figure 9:
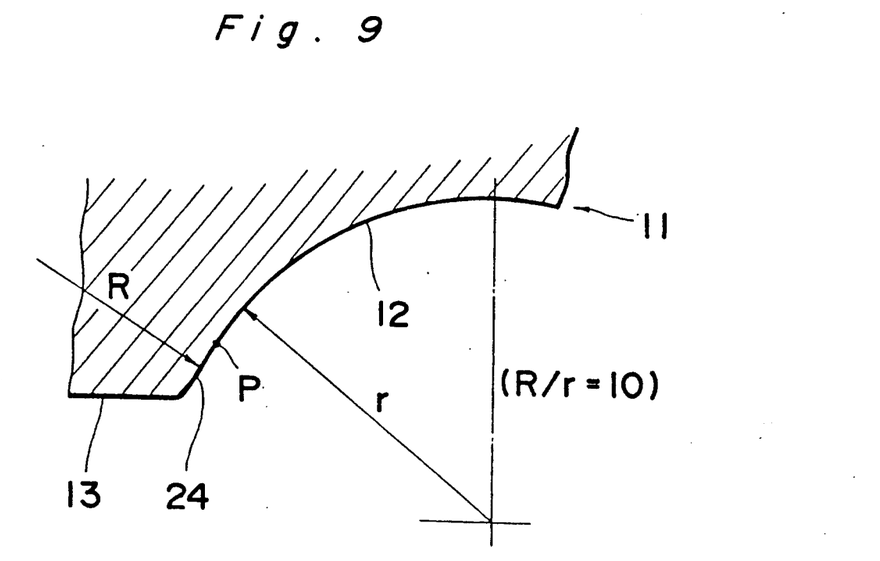
FIG. 9 is a cross sectional view of a raceway groove and a curved portion according to a second embodiment of the present embodiment.

FIG. 9 shows essential parts in accordance with a second embodiment of the present invention. This figure corresponds to FIG. 5 for the first embodiment. The second embodiment is essentially the same as the first embodiment, except that the second embodiment has a chamfer 24 whose radius of curvature R in the axial direction is ten times the radius of curvature r of the raceway groove 12. Specifically, this second embodiment differs from the first embodiment only in that the radius of curvature ratio R/r=0. Further description of the other parts is therefore omitted.

As obviously shown in FIG. 6, the depth of the ball scratches is less with the second embodiment than the ball scratch depth resulting from the first embodiment. In other words, the scratch depth at a given chamfer override rate can be further reduced from that achievable with the first embodiment. Therefore, if a scratch of the same depth is allowed, an even higher chamfer override rate can be set with the second embodiment than with the first embodiment. This is also evident from FIG. 7.

As shown in FIG. 7, in the case of the second embodiment wherein R/r=10, the sum of dent depths at every inflection point diameter or shoulder (chamfer) override rate is significantly reduced from the sum resulting from the conventional bearing (shown by A in FIG. 7), and is also approximately one-half that resulting from the first embodiment (wherein R/r=1). Conversely stated, if a given sum of dent depths is allowed, the inflection point diameter according to the second embodiment of this invention can, of course, be made greater than the edge diameter of the conventional bearing, and can also be made greater than the inflection point diameter of the first embodiment. In other words, the shoulder (chamfer) override rate can be set even higher than is possible with the first embodiment.

As described above, according to the second embodiment, because the radius of curvature R of the chamfer 24 is ten times as large as that r of the raceway groove 12, an edge load acting on the ball 15 when the chamfer override occurs is alleviated even more than in the first embodiment wherein the radius of curvature ratio R/r=1. As a result, scratching of the ball surface or the edge of the raceway groove 12 is suppressed even more, and bearing life is thus more extended.

In FIG. 7 are also shown test results obtained with an alternative embodiment wherein the radius of curvature ratio R/r is 5, another alternative embodiment wherein the radius of curvature ratio R/r is 20, and a reference specimen wherein the radius of curvature ratio R/r is 0.5. As will be understood from FIG. 7, in the bearings having the radius of curvature ratio (R/r) of 5 or more according to the present invention, the inflection point diameter (shoulder (chamfer) override rate) can be made significantly larger than the conventional bearing. It can be therefore concluded that a radius of curvature ratio R/r of 5 or greater is effective with respect to alleviating the edge load.

It shall be noted that the present invention is not limited to a bearing having only two raceway grooves in the bearing ring. It shall be further noted that though the above description refers mainly to the outer ring 11, a similar thing can be said with respect to the inner ring 16.

As obvious from the above description, the radial ball bearing according to the present invention can alleviate the edge load acting on the ball or the edge of the raceway groove when a large axial load is applied and shoulder (chamfer) overriding occurs, thereby reducing the damage which occurs to the ball and raceway groove in the conventional radial ball bearing. Therefore, the service life of the bearing can be extended, and abnormal noises can be prevented from arising during use of the bearing, particularly when a large axial load is applied.

In addition, if a certain depth of scratches is allowed in the ball and raceway groove, the shoulder override rate or chamfer override rate can be designed greater than in the conventional bearings. Accordingly, it is possible to make the inflection point diameter, which corresponds to the diameter at the edge of the raceway groove in the conventional bearings, larger when the bearing ring is the outer ring, and smaller when the bearing ring is the inner ring. This makes it possible to set the distance from the deepest point in the raceway groove to the inflection point, i.e., the raceway groove depth, less than that in the conventional bearing. Thereby the inside diameter at the shoulder of the outer ring can be made larger, and the outside diameter at the shoulder of the inner ring can be made smaller, as compared with the conventional bearing. Therefore, a smaller allowance can be used when finishing the raceway groove in the present invention, resulting in reductions in the machining time and the manufacturing costs. Furthermore, because of an easy machining, the finished state is good, and the defect rate can be greatly reduced.

Furthermore, among others, when the radius of curvature R of the curved portion provided between the raceway groove and the shoulder is five or more times as great as the radius of curvature r of the raceway groove, the edge load acting on the edge of the raceway groove or the ball when shoulder (chamfer) overriding occurs can be alleviated almost to the limit. In other words, a maximum stress occurring at contact portions of the ball and the raceway can be reduced to an extremely low value. Therefore, if $R \leq 5r$, the depth of scratches which may occur on the ball or raceway groove can be reduced greatly, as compared with the case that $R < 5r$, and a much longer bearing life can be achieved than with the conventional bearings. Furthermore, at a given scratch depth allowance in the ball and raceway groove, the shoulder (chamfer) override rate can be set at a level significantly greater than in the conventional bearings, and can, moreover, be set at approximately a maximum possible value.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radial ball bearing, comprising:
a pair of bearing rings, each said bearing ring having at least one raceway groove with a first radius of curvature and a shoulder, said bearing rings being disposed such that said raceway groove of one said bearing ring is positioned opposite to said raceway groove of the other said bearing ring; and a plurality of balls disposed rotatably between said raceway grooves positioned opposite to each other;

wherein each said bearing ring further comprises a curved portion having a second radius of curvature, said second radius of curvature being greater than or equal to five times said first radius of curvature;

wherein said curved portion and said raceway groove meet at an inflection point, said curved portion extending smoothly and continuously from said raceway groove; and wherein said inflection point lies within an ellipse of contact formed between a said ball and said bearing ring by a predetermined axial load.

* * * * *